United States Patent [19]
Dürsch et al.

[11] Patent Number: 4,749,758
[45] Date of Patent: Jun. 7, 1988

[54] PROCESS FOR THE PREPARATION OF COPOLYMERS OF VINYLPHOSPHONIC ACID AND (METH) ACRYLIC ACID IN AQUEOUS SOLUTION

[75] Inventors: Walter Dürsch, Königstein; Jürgen Grosse, Erftstadt-Liblar; Werner Gohla, Niederkassel; Friedrich Engelhardt; Ulrich Riegel, both of Frankfurt am Main, all of Fed. Rep. of Germany

[73] Assignee: Hoechst Aktiengesellschaft, Frankfurt am Main, Fed. Rep. of Germany

[21] Appl. No.: 858,568

[22] Filed: Apr. 24, 1986

Related U.S. Application Data

[63] Continuation of Ser. No. 734,786, May 16, 1985, abandoned.

[30] Foreign Application Priority Data

May 18, 1984 [DE] Fed. Rep. of Germany ....... 3418496

[51] Int. Cl.$^4$ .............................................. C08F 2/00
[52] U.S. Cl. .................................. 526/216; 526/227; 526/274; 526/278
[58] Field of Search ................ 526/227, 216, 274, 278

[56] References Cited

U.S. PATENT DOCUMENTS

| | | | |
|---|---|---|---|
| 3,208,943 | 9/1965 | Kirby | 526/274 |
| 3,297,663 | 1/1967 | Herbst et al. | 526/274 |
| 4,033,983 | 7/1977 | Starks | 526/278 |
| 4,342,857 | 8/1982 | Gaffar | 526/278 |

FOREIGN PATENT DOCUMENTS

| | | | |
|---|---|---|---|
| 1125658 | 3/1962 | Fed. Rep. of Germany | 526/278 |
| 1188411 | 3/1965 | Fed. Rep. of Germany | 526/278 |
| 1290724 | 9/1972 | United Kingdom . | |

*Primary Examiner*—Joseph L. Schofer
*Assistant Examiner*—J. M. Reddick

[57] ABSTRACT

Process for the preparation of polymers of vinylphosphonic acid in water with the aid of catalysts which form free radicals, which comprises heating vinylphosphonic acid and (meth)acrylic acid to temperatures of 40° to 120° C. in water in the presence of 1 to 5.5% by weight of aliphatic peroxy esters and/or diacyl peroxides which dissociate by half in one hour at temperatures below 122° C., the total amount of vinylphosphonic acid being taken together with up to 30% by weight, based on the total amount of monomer, of (meth)acrylic acid and the remainder of the (meth)acrylic acid being added in the course of the reaction.

The copolymers are suitable for use in detergent and cleaning agents.

7 Claims, No Drawings

PROCESS FOR THE PREPARATION OF COPOLYMERS OF VINYLPHOSPHONIC ACID AND (METH) ACRYLIC ACID IN AQUEOUS SOLUTION

This case is a continuation of my copending application Ser. No. 734,786 filed May 16, 1985, now abandoned.

Copolymers of vinylphosphonic acid and acrylic acid are of practical interest as thickeners, anticorrosion agents and surface-treatment agents. The preparation of water-soluble copolymers from vinylphosphonic acid and acrylic acid in oulk ano in organic solvents has already been described.

In the polymerization in bulk according to Example 1 of German Auslegeschrift No. 1,135,176, hard solid compositions are formed which can be processed only with great difficulty. When organic solvents (isopropanol) are used, as described in Example 3 of the same publication, the copolymer must be precipitated with the aid of other solvents which are more hydrophobic, such as, for example, ethyl acetate, and then filtered off with suction. Precipitation polymerizations from ethyl acetate (German Offenlegungsschrift No. 1,801,411) are similarly cumbersome. Troublesome working up of the solvents cannot be avoided here. In addition, under these experimental conditions, the vinylphosphonic acid employed, as a monomer which is comparatively difficult to polymerize, is only partly incorporated into the polymer. When Example 3 of German Auslegeschrift No. 1,135,176 was repeated, it was found, for example, that, according to the $P^{31}$-NMR spectrum, more than half of the vinylphosphonic acid employed was still present as the monomer. Because of these serious disadvantages of the processes known hitherto, the preparation of copolymers in water as the solvent is of great economic and ecological interest.

Surprisingly, a simple process has now been found for the preparation of copolymers of vinylphosphonic acid and (meth)acrylic acid in which only residual contents of vinylphosphonic acid of less than 20%, preferably less than 12%, result. This process comprises heating vinylphosphonic acid and (meth)acrylic acid to temperatures of 40° to 120° C. in water in the presence of 1 to 5.5% by weight of aliphatic peroxy esters or diacyl peroxides which dissociate by half in one hour at temperatures below 122° C., the total amount of vinylphosphonic acid being taken together with up to 30% by weight, based on the total amount of monomer, of (meth)acrylic acid and the remainder of the (meth)acrylic acid being added in the course of the reaction.

Acrylic acid and methacrylic acid are suitable for the process, and acrylic acid is preferred. Monomeric vinylphosphonic acid is today available on an industrial scale via two different routes.

1. Expensive process (for the preparation of pure vinylphosphonic acid).

Tris-(2-chloroethyl) phosphite is prepared from phosphorus trichloride and ethylene oxide, and bis(2-chloroethyl) 2-chloroethanephosphonate, inter alia, is formed therefrom by Arbusov rearrangement. After phosgenation and splitting off of hydrogen chloride by means of heat, vinylphosphonic acid dichloride results, which, after purification by distillation, is hydrolyzed with water to give pure vinylphosphonic acid.

This process is relatively expensive and not particularly low-polluting. Chlorine atoms must first be introduced by phosgenation, and removed again later in the form of hydrogen chloride.

2. Low-polluting halogen-free process (for the preparation of "crude vinylphosphonic acid" or "ester-containing crude vinylphosphonic acid").

The dimethyl 2-acetoxyethanephosphonate formed in a yield of more than 90% by reacting dimethylphosphite with vinyl acetate is pyrolyzed at 180°-200° C. in accordance with German Offenlegungsschrift No. 3,001,894 to give a "pyrolysate" which still contains methyl groups and also comprises, inter alia, various pyro-vinylphosphonic acid derivatives. In accordance with German Offenlegungsschrift No. 3,110,975, the action of water on this product at temperatures above 100° C. for several hours results in an inexpensive "crude vinylphosphonic acid" which, according to the $P^{31}$-NMR spectrogram, has the following composition: ("%" here denotes percentages in each case based on the total area of all the $P^{31}$ resonance signals)

| | |
|---|---|
| $CH_2=CH-\overset{O}{\underset{\|}{P}}(-OH)_2$ | 66–75% |
| $CH_2=CH-\overset{O}{\underset{\|}{\underset{OH}{P}}}-O-C_2H_4-\overset{O}{\underset{\|}{P}}(-OH)_2$ | 2–13% |
| $HOC_2H_4-\overset{O}{\underset{\|}{P}}(-OH)_2$ | 1–6% |
| $CH_3-OC_2H_4-\overset{O}{\underset{\|}{P}}(OH)_2$ | 2–4% |
| $H_3PO_4$ | 6–10% |
| Other P compounds | 3–10% |

Because of their particularly advantageous cost, the "ester-containing crude vinylphosphonic acid" formed by adding at least 2% of water to the "pyrolysate" at temperatures below 100° C. is of particular practical interest.

According to the $P^{31}$-NMR spectrogram, it has the following composition (in % of the total P): (R here denotes hydrogen or methyl)

| | |
|---|---|
| $CH_2=CH-\overset{O}{\underset{\|}{P}}(-OH)_2$ | 28–40% |
| $CH_2=CH-\overset{O}{\underset{\|}{\underset{OH}{P}}}-OCH_3$ | 20–30% |
| $CH_2=CH-\overset{O}{\underset{\|}{P}}(-OCH_3)_2$ | 2–6% |
| $CH_2=CH-\overset{O}{\underset{\|}{\underset{OH}{P}}}-O-C_2H_4-\overset{O}{\underset{\|}{\underset{OH}{P}}}-OR$ | 5–7% |
| $RO-C_2-H_4-\overset{O}{\underset{\|}{\underset{OH}{P}}}-OR$ | 11–14% |

-continued

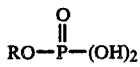   7-10%

Other P compounds   0-10%

Both the pure vinylphosphonic acid and the "crude" vinylphosphonic acid accessible by the low-polluting second process and the "ester-containing crude vinylphosphonic acid" are suitable for the process according to the invention. If the latter is used, polyvinylphosphonic acids which in some cases still carry methyl groups are formed.

Free radical polymerization reactions in general proceed better the purer the monomers. It was therefore particularly surprising that the "crude" vinylphosphonic acid and the "ester-containing crude vinylphosphonic acid" can also be copolymerized under the conditions according to the invention, even though they already contain 20-30% of impurities in the form of various P-containing acids which are free from vinyl groups. The acid compounds with free acid groups can be partly or completely replaced by sodium salts, potassium salts, ammonium salts or amine salts.

It is necessary for sufficient amounts of water to be present in the process according to the invention so that the reaction mixtures remain stirrable and processable.

Possible diluents in place of water are also the phosphorus-containing acid substances which are free from vinyl groups, are unavoidably obtained in the low-polluting second preparation process for vinylphosphonic acid and are present in the "crude" vinylphosphonic acid or in the "ester-containing crude vinylphosphonic acid". They can replace some or all of the water.

The total amounts of diluent during the polymerization is 10–400%, preferably 20–300%, based on the total amount of monomers.

Acrylic acid and methacrylic acid polymerize more rapidly than vinylphosphonic acid. Only 0–30% thereof, preferably 0–20%, based on the total amount of monomer, is therefore taken together with the vinylphosphonic acid, and most is added in the course of the reaction period.

The more water there is present, especially already at the start, the more catalyst is required and the longer are the reaction times necessary. After the polymerization has been carried out, any desired other amounts of diluent can also be added, for example to establish a certain viscosity.

The water for the dilution is added batchwise or continuously, separately or mixed with acrylic acid or methacrylic acid, at the rate demanded by the increasing viscosity and the problems in mixing which occur.

If the use of as little catalyst as possible is preferred, it is advisable to add no water or water in an amount of only 5–30% at the start and to add a total of a further 5–370%, preferably 15–270%, continuously or in approximately equal portions at the rate at which the polymerization advances and the rate necessitated by too high a viscosity.

It is advisable to cover the reaction mixtures with a layer of inert gas. If covering with an inert gas is omitted, higher residual monomer contents may result and discolorations may occur.

Suitable catalysts which act as free radicals are those which 1. already dissociate by half in one hour below 122° C. and
2. belong to the groups of compounds comprising aliphatic peroxy esters and/or aliphatic diacyl peroxides.

Surprisingly, other known free radical initiators are unsuitable since they are either too slow to react, such as, for example, di-t-butyl peroxide or t-butyl peroxybenzoate, or result in discolorations and/or unpleasant odors on prolonged heating with water and/or residual monomer contents of far above 20%, which are too high, such as, for example, potassium persulfate, dibenzoyl peroxide, azo-diisobutyronitrile and the like. For practical reasons, of the peroxy compounds which are suitable, those which have already dissociated by half in one hour under about 80° C. are less preferable. They have the disadvantage that, because of their sensitivity towards heat, they must be diluted with aliphatics, for example already after the preparation, and transported or stored at temperatures below 0° C. Such peroxy compounds which may be mentioned are: dimyristyl peroxy-dicarbonate, diisopropyl peroxy-dicarbonate, t-butyl peroxyneodecanoate, t-amyl peroxyneodecanoate, t-butyl perpivalate and bis-(3,5,5-trimethylhexanoyl) peroxide.

In contrast, aliphatic diacyl peroxides or peroxy esters which dissociate by at most half in one hour at between 80° and 122° C. and which are easy to handle are preferred, such as, for example, didecanoyl peroxide, dilauroyl peroxide, t-butyl peroxyisobutyrate, t-butyl peroxy-3,5,5-trimethyl-hexanoate and t-butyl peroxyacetate. t-Butyl peroxy-2-ethyl-hexanoate, which dissociates by half in one hour at 92° C., is particularly preferred. Mixtures of the catalysts can also be used.

The total amounts of catalysts necessary are 1.0 to 5.5%, preferably 1.5–4.0%. If less than 1.0% of catalyst is used, vinylphosphonic acid residual monomer contents which in some cases are far above 25% result. The amounts of catalyst required are lower the less diluent there is present.

It is not advantageous to add all the catalyst at the start of the polymerization. At the high monomer concentrations necessary, this procedure leads to a highly exothermic reaction at the start and overall to relatively higher residual monomer contents. Rather, it is preferable to maintain as constant as possible a concentration of free radical-donating molecules for several hours. This can be effected, for example, by initially adding only 0.1–1.0%, preferably 0.3 to 0.8%, of the catalysts at the start of the polymerization, when the reaction temperature has been reached, and by subsequently adding the catalysts in a further total amount of 0.9–5.4%, preferably 1.2–3.9%, continuously or divided into 1–24, preferably 2–12, equal portions at approximately equal intervals of time, during the reaction. When the addition of catalyst has ended, the mixture must be subsequently stirred for a further 1 to 10, preferably 2–6, hours at elevated temperature, advantageously at the reaction temperature.

The reaction temperatures can be between 40° C. and 120° C., and are preferably 60°–110° C. They depend on the dissociation half-life of the catalyst used. Reaction temperatures not more than about ±25° C., particularly preferably ±0° to 10° C., below or above the temperature at which the dissociation half-life of the catalyst used is one hour are particularly suitable.

The suitable reaction times are approximately inversely proportional to the concentrations of monomeric vinylphosphonic acid, the concentrations of catalysts and the reaction temperatures, which are specific for the catalyst used. They are in total, including the subsequent stirring time, between 4 and 60 hours, preferably between 10 and 30 hours.

The contents of copolymerized vinylphosphonic acid and residual vinylphosphonic acid in the end products can be determined exactly by $P^{31}$-NMR spectroscopy. Iodine number determinations provide information into the total residual monomer content. Solid copolymers can very easily be obtained by stripping off the water in vacuo.

The copolymers obtained by the process described above are employed as builder additives in detergent and cleaning agents.

Pentasodium triphosphate, $Na_5P_3O_{10}$, also industrially called sodium tripolyphosphate, NTPP, is a content of detergent which is decisive for the washing success of detergent and cleaning agents.

The compound has the following active properties:
complexing of alkaline earth metal ions,
selective adsorption at interfaces between the textile substrate and soil
intensification of the action of anionic surfactants
dispersion of pigment dirt
alkaline reaction
buffer action
"threshold" action
builder substance for detergent and cleaning agents.

The calcium-binding capacity, the dispersing action and the "threshold" effect are of particular importance for the cleaning efficiency of current detergents. "Threshold" effect is understood as meaning the properties of a substance, when used in less than the stoichiometric amount, of preventing or delaying precipitation of hardness salts.

An undesirable side effect of NTPP is that—alongside phosphates from other sources, such as fertilizers, agriculture, faeces, soil erosion and many others—it contributes to the introduction of phosphorus into water. Excessive phosphate concentrations, especially in stagnant and slowly flowing waters, can lead to eutrophication phenomena.

For this reason, phosphate substitutes of comparable suitability have been sought for a long time. In various countries, official steps have been taken to restrict or prohibit the use of NTPP in detergent and cleaning agents. In the Federal Republic, for example, the reduction of phosphates in detergents led to a comparatively poor evaluation of the use value, i.e. to poorer detergents. In particular, increased fabric encrustation was observed. Too high a fabric encrustation without doubt impairs the use properties of the material washed.

There was thus the object of discovering additives which improve the action of the builder system and hence the washing effect of the detergent.

Many substances have been discussed as a complete or partial NTPP substitute, for example zeolite A, trisodium nitrilotriacetate, sodium citrate and the like. For various reasons—in some cases ecological objections, profitability, performance which is not adequate in all respects—no substance has yet been found which has been able to find acceptance as a sole NTPP substitute. Rather, the opinion has been increasingly expressed that combinations of builders or builder additives may produce optimum performance.

Builder additives here are to be described as compounds which, when used in relatively small concentrations, exert a noticeable influence on the builder system. This includes, in particular, phosphonic acids and polymeric carboxylic acids.

These polymeric carboxylic acids can be prepared on the basis of the following ethylenically unsaturated monomers: (substituted) acrylic acids, maleic acid (anhydride), acrolein, glyoxylic acid alkyl esters, chloroacrylic acid and vinylphosphonic acid. Both homopolymers and in some cases copolymers of the monomers mentioned or of further suitable unsaturated compounds have been employed.

Examples of suitable phosphonic acids are aminomethylene phosphonic acids and hydroxyethanediphosphonic acid. Because of their high production costs, these compounds can be employed in the detergent only in a concentration range of about 1%.

When investigating the influence of builder additives, synergistic or antagonistic effects are observed, i.e. there is a mutual positive or negative influencing of the contents of the detergent. For example, polymeric carboxylic acids or phosphonic acids can act differently on, for example, detergent formulations containing NTPP or zeolite A. The use of copolymers of acrylic acid/vinylphosphonic acid prepared from ethyl acetate by precipitation polymerization as the sole builder has already been described. However, this use is not economically justifiable. It has also been mentioned that vinylphosphonic acid cannot be used as a decisive constituent of copolymers in detergent and cleaning agents.

Surprisingly, it has now been found that vinylphosphonic acid is a particularly suitable monomer for the preparation of outstanding builder additives and the copolymers prepared by the process described above are excellently suitable for this purpose. However, the use as builder additives is not restricted to the copolymers prepared by the process described above, but copolymers which are based on vinylphosphonic acid/(meth)acrylic acid and which have been prepared by other processes can also be used for the intended purpose.

All of these copolymers can also contain up to 20 mole % of other olefinically unsaturated comonomers, such as, for example, ethylene, butadiene, chloroprene, (meth)acrylamide, acrylamidosulfonic acid, vinylsulfonic acid, allylsulfonic acid, vinyl acetate, vinylglycol, hydroxyethyl acrylate, hydroxypropyl acrylate or methyl (meth)acrylate.

The vinylphosphonic acid/(meth)acrylic acid copolymers have the following advantages:
they are distinguished by an outstanding encrustation-inhibiting action in combination both with NTPP and with zeolite A,
can be prepared more economically than phosphonic acids,
have considerably higher calcium-binding values than commercially available polymeric carboxylic acids,
display outstanding dispersing properties and a "threshold" effect, and thus have a graying-inhibiting action,
combine the properties of polymeric carboxylic acids and phosphonic acids in one substance.

If they are granulated, the detergent and cleaning agents preferably contain 5–40% by weight of surfactants, 0.10–50% by weight of builders and washing auxiliaries. If marketed in liquid form, they preferably contain 10–55% by weight of surfactants and 0.1–30% by weight of builders, in addition to washing auxiliaries.

The content of vinylphosphonic acid/(meth)acrylic acid copolymers is in all cases 0.05 to 15% by weight.

The surfactants are preferably anionic, zwitterionic (ampholytic) or non-ionic in nature. Anionic surfactants are to be understood as meaning the water-soluble salts of higher fatty acids or resin acids, such as sodium soaps or potassium soaps of coconut oil, palm kern oil or rape oil, and of tallow and mixtures thereof. These furthermore include higher alkyl-substituted aromatic sulfonates, such as alkylbenzene sulfonates with 9 to 14 carbon atoms in the alkyl radical, alkylnaphthalene sulfonates, alkyltoluene sulfonates, alkylxylene sulfonates or alkylphenol sulfonates; fatty alcohol sulfates (R—CH$_2$—O—SO$_3$Na; R=C$_{11-17}$) or fatty alcohol ether-sulfates, such as alkali metal lauryl-sulfates or alkali metal hexadecylsulfates, triethanolamine lauryl-sulfate, sodium oleylsulfate or potassium oleyl-sulfate and sodium or potassium salts of lauryl-sulfate ethoxylated with 2 to 6 moles of ethylene oxide. Other suitable anionic surfactants are secondary linear alkanesulfonates and α-olefin-sulfonates with a chain length of 12–20 carbon atoms.

Non-ionic surfactants are to be understood as meaning those compounds which have an organic hydrophobic group and a hydrophilic radical, for example the condensation products of alkylphenols or higher fatty alcohols with ethylene oxide, the condensation products of polypropylene glycol with ethylene oxide or propylene oxide, the condensation products of ethylene oxide with the reaction product of ethylenediamine and propylene oxide, and longchain tertiary amine oxides, for example of the formula

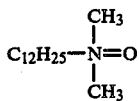

Finally, surfactants with zwitter-ionic (ampholytic) character include the following compounds: derivatives of aliphatic, secondary and tertiary amines or quaternary ammonium compounds with 8 to 18 carbon atoms and a hydrophilic group in the aliphatic radical, such as, for example, sodium 3-dodecylaminopropionate, sodium 3-dodecylaminopropanesulfonate, 3-(N,N-dimethyl-N-hexyldecylamino)-propane-1-sulfonate or fatty acid aminoalkyl-N,N-dimethylacetobetaine, wherein the fatty acid contains 8 to 18 carbon atoms and the alkyl radical contains 1–3 carbon atoms.

Suitable builder substances for the detergents according to the invention are inorganic or organic salts with a weakly acid, neutral or alkaline reaction, in particular inorganic or organic complexing agents.

Salts which have a weakly acid, neutral or alkaline reaction and can be used are, for example, the bicarbonates, carbonates or silicates of the alkali metals, and furthermore mono-, di- or tri-alkali metal orthophosphates, di- or tetra-alkali metal pyrophosphates, metaphosphates known as complexing agents, alkali metal sulfates and the alkali metal salts of organic sulfonic acids, carboxylic acids and sulfocarboxylic acids which contain 1 to 8 carbon atoms and do not have a capillary action. These include, for example, water-soluble salts of benzene-, toluene- or xylene-sulfonic acid, water-soluble salts of sulfoacetic acid or sulfobenzoic acid or salts of sulfodicarboxylic acids, and the salts of acetic acid, lactic acid, citric acid, tartaric acid, oxydiacetic acid (HOOC—CH$_2$—O—CH$_2$—COOH), oxydisuccinic acid, 1,2,3,4-cyclopentanetetracarboxylic acid, polyacrylic acid and polymaleic acid.

Suitable complexing builder substances are also the metaphosphates which have a weakly acid reaction and the polyphosphates which have an alkaline reaction, in particular tripolyphosphates. They can be replaced entirely or partly by organic complexing agents. The organic complexing agents include, for example, nitrilotriacetic acid, ethylenediaminetetraacetic acid, N-hydroxyethylethylenediaminetriacetic acid, polyalkylene-polyamine-N-polycarboxylic acids and other known organic complexing agents, it also being possible for combinations of the various complexing agents to be employed.

Washing auxiliaries according to the invention include products such as the alkali metal or ammonium salts of sulfuric acid, silicic acid, carbonic acid, boric acid and alkylene-, hydroxyalkylene- or aminoalkylene-phosphonic acids, and bleaching agents, stabilizers for peroxide compounds (bleaching agents) and water-soluble organic complexing agents.

Specifically, the bleaching agents include sodium perborate mono- or tetra-hydrate, the alkali metal salts of peroxomonosulfuric or peroxodisulfuric acid and the alkali metal salts of peroxodiphosphoric acid (H$_4$P$_2$O$_8$). Water-soluble, precipitated magnesium silicate, for example, functions as a stabilizer for these bleaching agents. Organic complexing agents are the alkali metal salts of iminodiacetic acid, nitrilotriacetic acid, ethylenediaminetetraacetic acid, methylenediphosphonic acid, 1-hydroxyethane-1,1-diphosphonic acid and nitrilotrismethylenephosphonic acid.

Washing auxiliaries which increase the soil suspending power of washing liquors, such as carboxymethylcellulose, carboxymethyl-starch, methylcellulose or copolymers of maleic anhydride with methyl vinyl ether, foam regulators, such as mono- and di-alkylphosphoric acid esters with 16 to 20 carbon atoms in the alkyl radical, and optical brighteners, disinfectants and/or proteolytic enzymes can also be additional constituents of the detergent.

The detergent and cleaning agents can be worked into detergents in the customary manner, by spray-drying or mixing, for example in spray mist mixing apparatuses or by means of other suitable units. Another advantage of the builder additives according to the invention is their contribution towards "anti-caking", i.e. to prevention of the separation phenomena, especially in detergent slurries with a high content of non-ionic surfactants.

The invention is illustrated by the following preparation and use examples. In this context, the following should be noted beforehand:

According to the P$^{31}$-NMR spectra, the types of vinylphosphonic acids used for the polymerization in the preparation examples have the composition shown below. The percentage data relate to percent phosphorus of the total phosphorus. They approximately correspond to the usual percentages by weight, since the particular molecular masses of the individual phosphorus compounds present deviate only relatively slightly from one another.

R denotes H in the acids 2 and 3 and H or CH$_3$ in the ester 4 and X is H or CH$_3$.

| Acid No. | Acid type |
| --- | --- |
| 1 | Pure vinylphosphonic acid |

-continued

| | | | | |
|---|---|---|---|---|
| 2 | Crude vinylphosphonic acid I | | | |
| 3 | Crude vinylphosphonic acid II | | | |
| 4 | Ester-containing crude vinylphosphonic acid | | | |

| Acid type No. | 1 | 2 | 3 | 4 |
|---|---|---|---|---|
| $CH_2=CH-P(O)(OH)_2$ | 100 | 66.8 | 66.5 | 30.8 |
| $CH_2=CH-P(O)(OH)(OCH_3)$ | 0 | 0 | 3.8 | 26.6 |
| $CH_2=CH-P(O)(OCH_3)_2$ | 0 | 0 | 0 | 4.9 |
| $CH_2/OC_2H_4P(O)(OH)(OR)$ | 0 | 12.6 | 5.8 | 6.5 |
| $XO-C_2H_4P(O)(OH)(OR)$ | 0 | 1.4 | 7.0 | 13.4 |
| $RO-P(O)(OH)_2$ | 0 | 8.7 | 7.0 | 8.9 |
| Unknown P compounds | 0 | 5.2 | 3.6 | 0.1 |

PREPARATION EXAMPLES

Example 1

A mixture of 54.0 g of pure vinylphosphonic acid, 7.2 g of acrylic acid and 10 ml of completely demineralized water is covered with a layer of nitrogen and heated to 90° C. After 30 minutes, 0.2 ml of t-butyl peroxy-2-ethyl-hexanoate is added, and this addition of catalyst is repeated a further nine times, in each case after a further two hours. After the last addition of catalyst, the mixture is subsequently stirred at 90° C. for four hours. After the fourth addition of catalyst, 10 ml of water are added, after the ninth addition a further 5 ml of water are added, and at the end of the subsequent stirring period another 20 ml of water are added, to maintain the stirrability. 103.6 g of a viscous solution of the copolymer with a solids content of 59.1% result. According to the $P^{31}$-NMR spectrum, only 5.4% of P (of the total phosphorus) is still present in the form of free vinylphosphonic acid.

Example 2

The procedure followed is as in Example 1. However, 43.2 g of pure vinylphosphonic acid and 14.4 g of acrylic acid are employed. 10 ml of water are added in each case after the second and seventh addition of catalyst and after the subsequent stirring. 92 g of a viscous solution of the copolymer with a solids content of 62.6% result. Only 7.1% of the vinylphosphonic acid is still present in the free non-polymerized form.

Example 3

10.8 g of pure vinylphosphonic acid and 10 g of completely demineralized water are heated to 90° C. under nitrogen. After 30 minutes, 64.8 g of acrylic acid and 3 ml of the catalyst from Example 1 are simultaneously and slowly added dropwise in the course of 6 hours. The addition of 20 ml of water is necessary after only 50 minutes. A further 120 ml of water are added in portions of in each case 10 ml at approximately equal intervals of time. After the addition of the catalyst, the mixture is subsequently stirred for 2 hours. 224.8 g of a viscous solution of the copolymer with a solids content of 33.6% result. According to the $P^{31}$-NMR spectrum, only 9.1% of the vinylphosphonic acid employed is still present as monomer.

Example 4

The procedure followed is as in Example 3, with the difference that 21.6 g of pure vinylphosphonic acid are taken together with 5 ml of water and only 57.6 g of acrylic acid are employed. A total of nine portions of 10 ml each of water must be added to maintain the stirrability of the batch.

Yield: 160.2 g
Solids content: 49.4%
Only 4.3% of the vinylphosphonic acid is still unreacted.

Example 5

The procedure followed is as in Example 3. However, 54 g of pure vinylphosphonic acid and 10 ml of water are taken and only 36.0 g of acrylic acid are added dropwise. In the dropwise addition period of six hours, four portions of 20 ml each of water are subsequently added.

Yield: 180 g.
Solids content: 50.0%
Only 16.0% of the vinylphosphonic acid is still unreacted.

Example 6

The procedure is as in Example 5. However, instead of 36.0 g of acrylic acid, 43 g of methacrylic acid are employed and four portions of 20 ml each of water are added during the dropwise addition and a further 40 ml are added after the subsequent stirring. 219 g of a viscous solution with a solids content of 44.3% result. Only 18.0% of the vinylphosphonic acid employed is still present as monomer.

Example 7

16.2 g of crude vinylphosphonic acid I (containing 10.8 g of pure vinylphosphonic acid) are heated to 90° C. under nitrogen. After 30 minutes, 3 ml of the catalyst from Example 1 and 64.8 g of acrylic acid are simultaneously added dropwise in the course of 6 hours. The first 10 ml of water are added after only 15 minutes. A further 12 portions of 10 ml each of water are subsequently added at approximately equal intervals of time before the end of the dropwise addition. The mixture is subsequently stirred for three hours and made up to 280 g with water.

The viscous solution contains 27.0% of mostly polymerized monomers. According to the $P^{31}$-NMR spectrum, only 1.2% of the vinylphosphonic acid is still present as monomer.

Example 8

The procedure followed is as in Example 7. However, 32.4 g of crude vinylphosphonic acid (=21.6 g of pure acid) are taken and only 57.9 g of acrylic acid are added dropwise. A total of 16 portions of 10 ml each of water are added in order to keep the batch stirrable. After the subsequent stirring, the mixture is made up to 311 g with water. 25.6% of mostly polymerized monomer is present in the viscous solution. Only 4.0% of the vinylphosphonic acid is not polymerized.

Example 9

The procedure followed is as in Example 7, but 81 g of crude vinylphosphonic acid (=54 g of pure vinylphosphonic acid) are taken and only 36.0 g of acrylic acid are added dropwise. The dropwise addition time is increased to 14 hours. Six portions of 10 ml each of water are added during the dropwise addition time, and a further 30 ml are added after the dropwise addition. 218 g of a viscous solution containing 41.3% of mostly polymerized monomer result. Only 9.3% of the vinylphosphonic acid is not polymerized.

Example 10

236 g of crude vinylphosphonic acid II (=156.9 g of pure acid) are heated to 85°–90° C. under nitrogen. After 30 minutes, a mixture of 463.2 g of acrylic acid and 960 ml of completely demineralized water and, simultaneously, 24 ml of the catalyst from Example 1 are added dropwise in the course of 12 hours. After the dropwise addition, the mixture is subsequently stirred for 2 hours. 1,655.4 g of a viscous solution containing 37.4% of mostly polymerized monomer and 42.2% of solids result. Only 1.2% of the vinylphosphonic acid employed is not polymerized.

Example 11

The procedure followed is as in Example 10, with the one difference that 236 g of ester-containing crude vinylphosphonic acid are used. 1,653.2 g of a viscous solution containing 42.3% of solids result. Only 1.9% of the vinylphosphonic acid derivatives employed is not polymerized.

Use examples

Explanation of the test methods of liquid is allowed to rise for 2 hours. A rating of 1 (very good), 2 (good), 3 (moderate) or 4 (poor) is given, depending on the degree to which the pigment also migrates.

3. "Threshold" test

The threshold action can be demonstrated visually by light scattering measurement (TYNDALL effect). $CaCO_3$ slurries which are prepared by combining 225 ml of water of 56°d ($CaCl_2$ hardness) with 25 ml of $NaHCO_3$ solution (molar ratio of $Ca^{2+}:HCO_3^- = 1:1.15$) in the presence of 80 ppm of test substance are used for the measurement. The turbidity course is then monitored and evaluated at room temperature by means of a scattered light photometer.

Evaluation is in accordance with the following scale of ratings:

Rating
4 (poor)=blank sample
3 (moderate)—clear reduction in the level of turbidity in comparison with the blank value
2 (good)—turbidity appears after a clear delay or greatly reduced turbidity
1 (very good)—no turbidity within 45 minutes The results are shown in Table I.

TABLE I

| Use Example | Preparation Example | Monomer according to (a) | Monomer according to (b) | Molar ratio a:b | Example 1 Calcium-binding capacity (mg of Ca/g of Na salt) 20° C. | Example 1 Calcium-binding capacity (mg of Ca/g of Na salt) 60° C. | Example 2 Dispersing properties rating | Example 3 Threshold test rating |
|---|---|---|---|---|---|---|---|---|
| 1 | 7 | $CH_2=CHCOOH$ | $H_2C=CHPO_3H_2$ | 9:1 | 351 | 345 | 1 | 1 |
| 2 | 8 | $CH_2=CHCOOH$ | crude | 8:2 | 385 | 294 | 1 | 1 |
| 3 | 10 | $CH_2=CHCOOH$ | | 8:2 | 435 | 435 | 1 | 1 |
| 4 | 3 | $CH_2=CHCOOH$ | $H_2C=CHPO_3H_2$ | 9:1 | 285 | n.d. | 1 | 1 |
| 5 | 4 | $CH_2=CHCOOH$ | pure | 8:2 | 263 | n.d. | 1 | 2 |
| 6 | 2 | $CH_2=CHCOOH$ | | 3.3:6.7 | 206 | 206 | 1 | 1–2 |
| 7 | 1 | $CH_2=CHCOOH$ | | 1.7:8.3 | 215 | 215 | 1 | 2–3 |
| Comparison | | technical grade polyacrylate (molecular weight 100,000–150,000) | | | 300 | 276 | 2 | 1–2 |
| | | Ethylenediaminetetra(methylenephosphonic acid) (EDTMP) | | | 290 | 290 | 1 | 1 |
| | | Acrylic acid/maleic acid copolymer (technical grade) | | | 260 | 240 | 1 | 1 |
| | | Hydroxyethanediphosphonic acid (HEDP) | | | 345 | 345 | 3 | 1 |

1. Calcium-binding capacity

The amount of complexing agent in the form of the sodium salt present at pH 10 which is required to redissolve a given amount of freshly precipitated $CaCO_3$ precipitate was determined. In contrast to, for example, the method based on calcium-sensitive electrodes, this method can also be employed at elevated temperature. If, with the same proportions, the solution remains clear both at 20° C. and at 60° C., the 20° C. value also applies at the elevated temperature. In general, the calcium-binding capacity decreases as the temperature increases.

2. Dispersing properties 0.2 g of the dispersing agent to be tested are taken in 100 ml of water of 23°d, which has been brought to pH 10 with sodium hydroxide solution, in a hard glass beaker and 0.5% by weight of iron oxide pigment (Bayferrox 130) is added. The pigment is dispersed for 5 minutes at 2,000 rpm using a saw-toothed stirrer with a disk diameter of 40 mm. The pH value is brought back to 10 again. 30 ml of the dispersion are introduced into a PVC beaker, a strip of filter paper (medium- to large-pored, 90 g/m²) is suspended in the dispersion and the column

Use Example 8—Washing experiment

Various test fabrics (terry cloth, EMPA[1] cotton, WFK[2] cotton, WFK polyester/cotton and interlock cloth) were washed with a non-soiled wash at 93° C. and 18°d 20 times using an experimental detergent of the following composition (dosage of in each case 150 g to the pre-wash and main wash):

| | |
|---|---|
| sodiumtriphosphate | 22.0% |
| surfactants | 14.5% |
| carboxymethylcellulose | 1.5% |
| ethylenediaminetetraacetate | 0.2% |
| optical brightener | 0.2% |
| enzymes | 0.25% |
| $NaBO_3.4 H_2O$ | 20.0% |
| Na disilicate | 5.0% |
| Mg silicate | 2.0% |
| $Na_2SO_4$ | 34.35% |

[1] EMPA=Eidgenössische Materialprüfanstalt (Federal Institute for the Testing of Materials)
[2] WFK=Wäschereiforschung Krefeld (Krefeld Laundry Research)

The inorganic fabric encrustation was then determined by ashing at 800° C.

By repeating the experiment with the addition of 1% of copolymer according to preparation Example 10, based on the amount of detergent, it was possible significantly to reduce the inorganic fabric encrustation (Table 2). The effect was better depending on the type of fabric, but at least comparable to the effect which resulted when 1% of commercially available polymeric carboxylic acids (for example technical grade polyacrylic acid, molecular weight 100,000–150,000; or technical grade copolymers based on maleic acid/acrylic acid or methyl vinyl ether/maleic anhydride) was used.

TABLE 2
(% ash after 20 washing cycles, 93° C., 18° d)

| | Experimental detergent % Ash | Experimental detergent + 1% of copolymer corresponding to preparation Example 10 % Ash |
|---|---|---|
| Terry cloth fabric | 3.18 | 0.84 |
| EMPA cotton | 2.68 | 1.66 |
| WFK cotton | 1.78 | 0.73 |
| WFK polyester/cotton | 1.10 | 0.32 |
| Interlock fabric | 2.48 | 0.85 |

We claim:

1. A process for the preparation of a polymer of vinylphosphonic acid in water with the aid of catalysts which form free radicals, which comprises heating vinylphosphonic acid and (meth)acrylic acid to temperatures of 40° to 120° C. in water in the presence of 1 to 5.5% by weight of aliphatic peroxy esters, aliphatic diacyl peroxides or mixtures thereof which dissociate by half in one hour at temperature below 122° C., the total amount of vinylphosphonic acid being taken together with up to 30% by weight, based on the total amount of monomer, of (meth)acrylic acid and the remainder of the (meth)acrylic acid being added in the course of the reaction.

2. The process as claimed in claim 1, wherein only 0.1 to 1% by weight of the total amount of the catalyst is added at the start of the reaction and a further 0.9 to 5.4% by weight of the catalyst is uniformly added in the course of the reaction.

3. The process as claimed in claim 1, wherein the reaction is carried out in the presence of aliphatic peroxy esters, aliphatic diacyl peroxides or mixtures thereof which dissociate by half in one hour between 80° C. and 121° C.

4. The process as claimed in claim 1, wherein said vinylphosphonic acid is a crude vinylphosphonic acid or an ester-containing vinylphosphonic acid containing up to 30% by weight of impurities which are free of vinyl groups.

5. The process as claimed in claim 4, wherein said vinylphosphonic acid contains up to 30% by weight of vinyl-free phosphonic acids and phosphoric acid or their monomethyl esters.

6. The process as claimed in claim 1, wherein the amount of residual unpolymerized vinylphosphonic acid is less than 20%.

7. The process as claimed in claim 1, wherein the total amount of vinylphosphonic acid to be used in the process is first heated to said temperature range in water and said catalyst and methacrylic acid or acrylic acid are subsequently added portionwise to said total amount of vinylphosphonic acid.

* * * * *